(12) United States Patent
Mori et al.

(10) Patent No.: US 10,938,014 B2
(45) Date of Patent: Mar. 2, 2021

(54) BATTERY WIRING MODULE

(71) Applicant: SUMITOMO WIRING SYSTEMS, LTD., Mie (JP)

(72) Inventors: Ryota Mori, Mie (JP); Hiroshi Sato, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 22 days.

(21) Appl. No.: 16/539,195

(22) Filed: Aug. 13, 2019

(65) Prior Publication Data

US 2020/0075915 A1 Mar. 5, 2020

(30) Foreign Application Priority Data

Aug. 29, 2018 (JP) .............................. JP2018-160507

(51) Int. Cl.
*H01M 4/02* (2006.01)
*H01M 2/20* (2006.01)
*H01M 2/34* (2006.01)
*H01M 2/10* (2006.01)
*H01M 10/0585* (2010.01)
*H01M 10/48* (2006.01)
*H01M 2/30* (2006.01)

(52) U.S. Cl.
CPC ......... *H01M 2/206* (2013.01); *H01M 2/1077* (2013.01); *H01M 2/30* (2013.01); *H01M 2/34* (2013.01); *H01M 10/0585* (2013.01); *H01M 10/482* (2013.01); *H01M 2220/20* (2013.01)

(58) Field of Classification Search
CPC ...................................................... H01M 4/02
See application file for complete search history.

(56) References Cited

U.S. PATENT DOCUMENTS

2014/0158396 A1 6/2014 Nakayama
2017/0194771 A1* 7/2017 Aoki ................... H01M 2/1077

FOREIGN PATENT DOCUMENTS

JP 2013-037988 2/2013

* cited by examiner

*Primary Examiner* — Jacob B Marks
(74) *Attorney, Agent, or Firm* — Greenblum & Bernstein, P.L.C.

(57) ABSTRACT

Provided is a battery wiring module that can hold busbars until they are connected to a secondary battery. A busbar is configured to connect battery terminals of a plurality of battery cells to each other, and has a recess portion that is recessed in a Z direction, which is a stack direction in which a housing is stacked on the battery cells. The battery wiring module includes a busbar holding portion configured to be inserted into the recess portions, and engage with the busbar in an X direction, which is a direction in which the battery cells are lined up, so as to hold the busbar.

6 Claims, 3 Drawing Sheets

BATTERY WIRING MODULE

TECHNICAL FIELD

The present invention relates to a battery wiring module.

BACKGROUND ART

As disclosed in JP 2013-37988A for example, in vehicles such as electric automobiles and hybrid automobiles, a high-voltage secondary battery, which is installed as a power supply for driving the vehicle when the vehicle is traveling, is provided with a battery wiring module. In the battery wiring module, a module-side terminal is connected to a busbar (a connecting member in JP 2013-37988A1) that connects a plurality of battery cells constituting the secondary battery to each other.

JP 2013-37988A is an example of related art.

SUMMARY OF THE INVENTION

Meanwhile, in the battery wiring modules as described above, it is conceivable that, for example, the busbar and the module-side terminal that are housed in a housing are connected to the secondary battery, or the module-side terminal that is housed in the housing is connected to the busbar connected to the secondary battery. However, for example, a case has not been considered in which the module-side terminal is housed in the housing, and then the busbar is attached to the housing. In this case, for example, the busbar needs to be held until it is connected to the secondary battery, but such a battery wiring module has not been developed.

The present invention was made to solve the aforementioned problem, and it is an object thereof to provide a battery wiring module that can hold a busbar until it is connected to a secondary battery.

Solution to Problem

In order to solve the aforementioned problem, a battery wiring module includes: a module-side terminal configured to be electrically connected to a busbar for connecting battery terminals of a plurality of battery cells to each other; a wire that has one end to which the module-side terminal is connected; and a housing in which the wire and the module-side terminal are housed, wherein the busbar is configured to connect the battery terminals of the plurality of battery cells to each other, and has a recess portion that is recessed in a stack direction in which the housing is stacked on the battery cells, and the battery wiring module further includes a busbar holding portion configured to be inserted into the recess portion, and engage with the busbar in a direction in which the battery cells are lined up, so as to hold the busbar.

According to the above-described aspect, as a result of including the busbar holding portion configured to be inserted into the recess portion, and engage with the busbar in the direction in which the battery cells are lined up, so as to hold the busbar, the battery wiring module can hold the busbar until it is connected to the secondary battery.

In the above-described battery wiring module, preferably, the busbar holding portion includes an elastic piece configured to apply an elastic force in the direction in which the battery cells are lined up.

According to the above-described aspect, as a result of the busbar holding portion including the elastic piece configured to apply an elastic force in the direction in which the battery cells are lined up, even when the busbar moves due to expansion or contraction of the battery cells, the elastic piece is bent to allow the busbar to move.

In the above-described battery wiring module, preferably, elastic pieces are provided on two sides in the direction in which the battery cells are lined up.

According to the above-described aspect, as a result of the elastic pieces being provided on two sides in the direction in which the battery cells are lined up, even when the busbar moves due to expansion or contraction of the battery cells, the elastic pieces are bent to allow the busbar to move.

In the above-described battery wiring module, preferably, the housing is provided with a movement restricting rib configured to restrict, together with the busbar holding portion, movement of the busbar in the stack direction.

According to the above-described aspect, as a result of the housing being provided with the movement restricting rib configured to restrict, together with the busbar holding portion, movement of the busbar in the stack direction, it is possible to restrict movement of the busbar in the stack direction.

Advantageous Effects of Invention

According to the battery wiring module of the present invention, it is possible to hold a busbar until it is connected to a secondary battery.

EMBODIMENTS OF THE INVENTION

Figure 1:
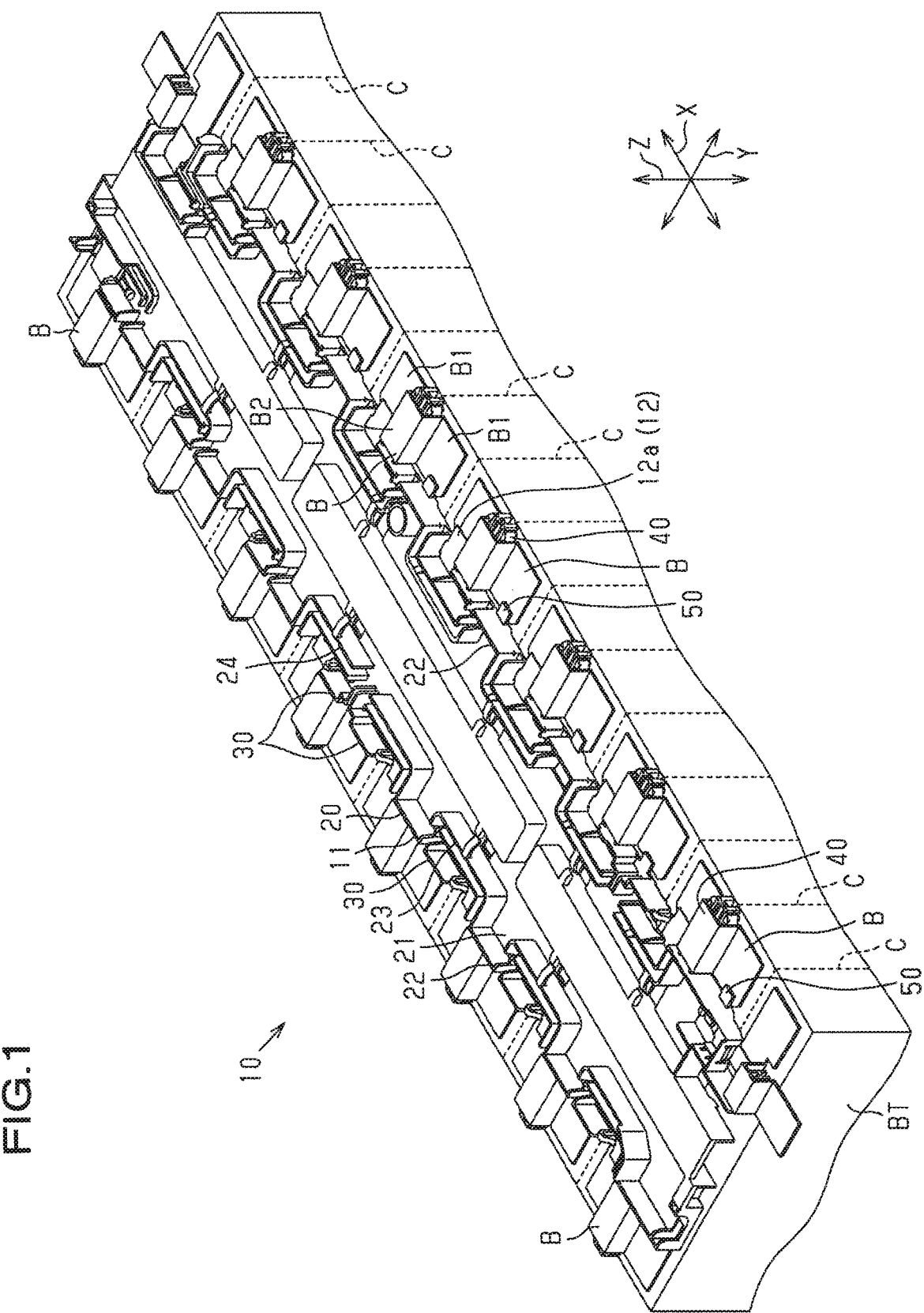
FIG. 1 is a perspective view illustrating a battery wiring module according to an embodiment.

Hereinafter, an embodiment of a battery wiring module will be described. Note that, in the drawings, part of a configuration may be exaggerated or simplified, for ease of description. Furthermore, dimensions of constituent components may be scaled differently from the actual ones.

As shown in FIG. 1, a battery wiring module 10 is mounted on the upper surface of a substantially cuboid secondary battery BT. Note that the secondary battery BT is installed in an electric automobile, a hybrid automobile, or the like, and supplies electric power to a vehicle traveling motor. Furthermore, the secondary battery BT is supplied with electric power from the traveling motor or a power generation motor depending on charge conditions or vehicle driving conditions. Here, in the following, description will be made assuming that, out of three directions X, Y, and Z in FIG. 1 that are orthogonal to each other, the X direction is a direction in which battery cells are lined up, the Y direction is a width direction of the battery wiring module, and the Z direction is a vertical direction.

The secondary battery BT includes a plurality of battery cells C, and not-shown positive and negative electrodes of the battery cells C are arranged on the battery wiring module 10 side (upper side).

The plurality of battery cells C are lined up in the X direction. At this time, the battery cells C are lined up such that their positive and negative electrodes, which serve as battery terminals, are alternately arranged in the direction in which the battery cells C are lined up, that is, in the X direction. Busbars B are provided for these terminals, each busbar being configured to connect adjacent terminals, that is, a positive electrode and a negative electrode, to each other. In other words, the battery cells C are connected in series by the busbars B. The busbars B of the present embodiment are connected to the positive electrodes and the negative electrodes of the battery cells C by welding, for example.

Figure 4:
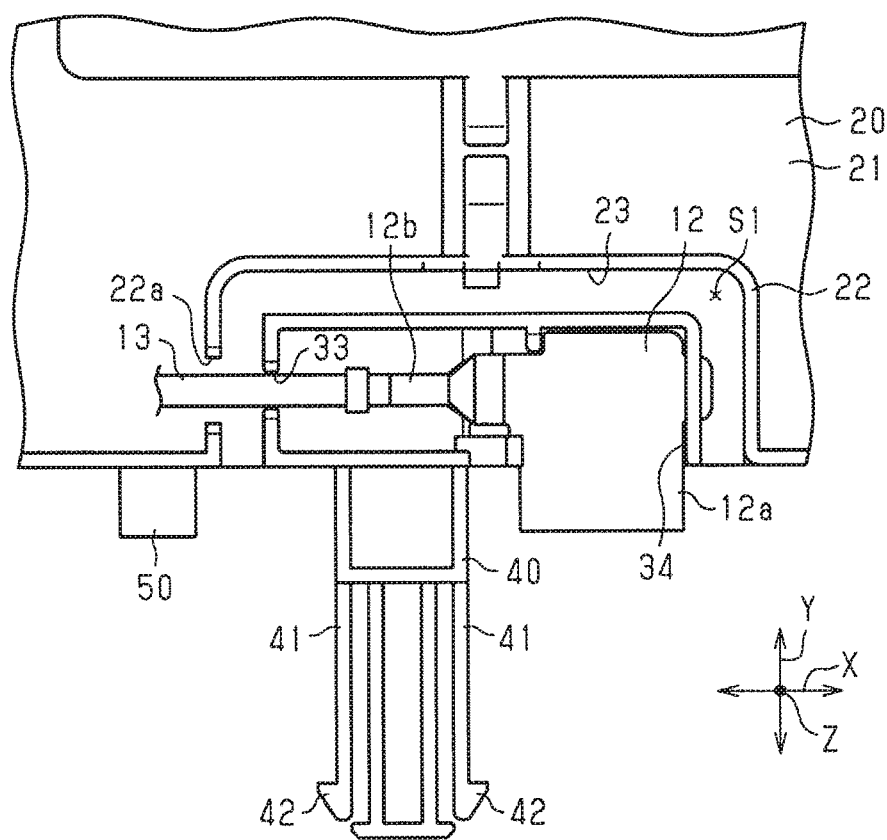
FIG. 4 is a top view of the battery wiring module according to the embodiment, illustrating a state in which the busbar is omitted.

As shown in FIG. 1, the battery wiring module 10 includes a housing 11, a plurality of module-side terminals 12, and a plurality of wires 13 (see FIG. 4).

The housing 11 has a shape such that, for example, the size in the X direction, which is the direction in which the battery cells C are lined up, is greater than the size in the Y direction, which is the width direction. The upper side of the housing 11 is open, and the opening is designed to be closed by a not-shown cover.

The housing 11 is made of, for example, a resin member. The housing 11 includes wire accommodating portions 20 in each of which a wire is accommodated, and terminal accommodating portions 30 in each of which a module-side terminal 12 is accommodated.

As shown in FIG. 4, each module-side terminal 12 has a flat plate-shaped terminal body 12a, and a barrel portion 12b that is contiguous from the terminal body 12a. The barrel portion 12b is electrically connected to the core wire of a wire 13.

As shown in FIGS. 1 to 4, the wire accommodating portions 20 of the housing 11 are compartments of the housing 11 that are formed by a bottom portion 21 and a side wall 22 that extends from the outer edge portion of the bottom portion 21. The wire accommodating portions 20 include a plurality of recess portions 23 and 24 arranged in the direction in which the plurality of battery cells C are lined up, the plurality of recess portions 23 and 24 being recessed in the direction that is orthogonal to the direction in which the plurality of battery cells C are lined up, and is orthogonal to a stack direction in which the housing 11 is stacked on the battery cells C, that is, the plurality of recess portions 23 and 24 being recessed in the width direction Y. Each recess portion 23 receives one terminal accommodating portion 30. Each recess portion 24 receives two terminal accommodating portions 30.

As shown in FIGS. 1 to 4, the terminal accommodating portions 30 of the housing 11 are compartments of the housing 11 that are formed by a bottom portion 31 and a side wall 32 that extends from the outer edge portion of the bottom portion 31. The terminal accommodating portions 30 are substantially cuboid shaped with a long length in the X direction. There is a gap S1 between a terminal accommodating portion 30 and a recess portion 23 of the corresponding wire accommodating portion 20, the gap S1 being provided on two sides, in the X direction, of the terminal accommodating portion 30 and on one side, in the Y direction, thereof. Furthermore, the side wall 32 of the terminal accommodating portion 30 has an opening 33 that is open in the X direction (to the wire accommodating portion 20 side), and an opening 34 that is open in the Y direction, which is orthogonal to X direction.

Figure 2:
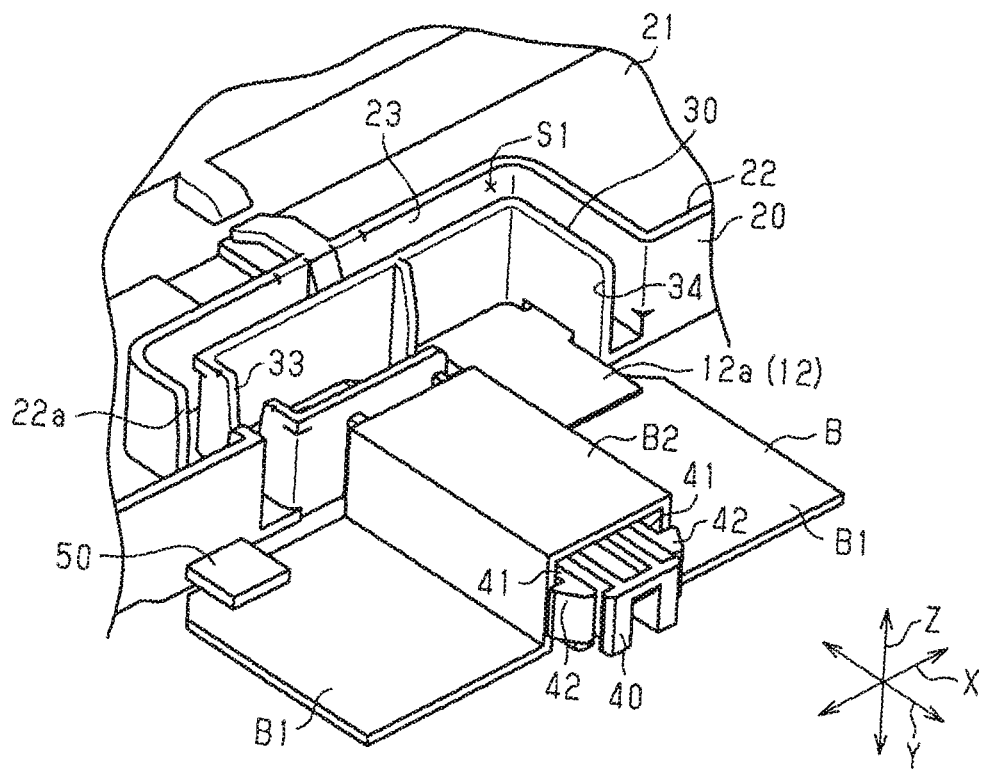
FIG. 2 is a perspective view illustrating part of the battery wiring module according to the embodiment.
Figure 3:
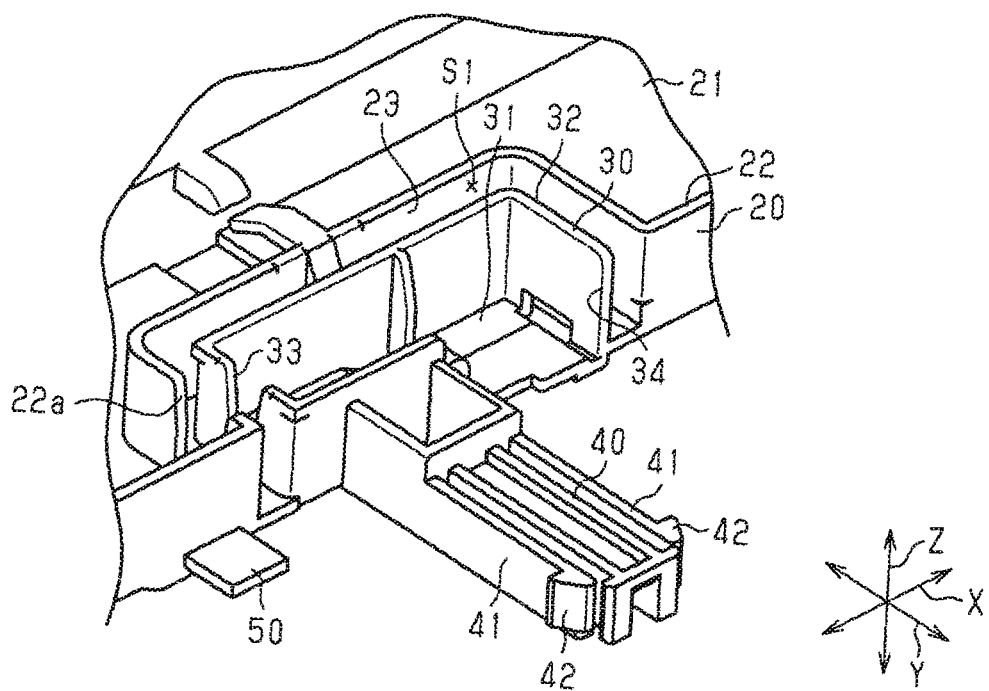
FIG. 3 is a perspective view of the battery wiring module according to the embodiment, illustrating a state in which a busbar and a module-side terminal are omitted.

As shown in FIGS. 2 and 3, the opening 33 that is open in the X direction of the terminal accommodating portion 30 faces, in the X direction, an opening 22a formed in the side wall 22 of the corresponding wire accommodating portion 20. Accordingly, the opening 33 of the terminal accommodating portion 30 and the opening 22a of the wire accommodating portion 20 can be used to guide the wire 13 connected to the module-side terminal 12 accommodated in the terminal accommodating portion 30 into the wire accommodating portion 20. In other words, the opening 33 of the terminal accommodating portion 30 and the opening 22a of the wire accommodating portion 20 function as openings for guiding (inserting) the wire 13.

As shown in FIGS. 2 and 3, the opening 34 is open outward in the Y direction (to the side opposite to the wire accommodating portion 20). The opening 34 allows part of the terminal body 12a of the module-side terminal 12 accommodated in the terminal accommodating portion 30 to be exposed to the outside in the Y direction. The part of the terminal body 12a that is exposed from the opening 34 is electrically connected to the busbar B.

As shown in FIGS. 1 and 2, the busbars B used in the present embodiment are made of a conductive plate material. Each busbar B has two connection plates B1 that are respectively connected to a positive electrode and a negative electrode of adjacent battery cells C. Furthermore, each busbar B of the present embodiment has, between the connection plates B1, a recess portion B2 that is recessed in the plate-thickness direction (Z direction) of the connection plates B1. The recess portion B2 is recessed in the direction (upward direction) away from the secondary battery BT in the Z direction.

As shown in FIGS. 1 to 4, the housing 11 is provided with busbar holding portions 40 that extend outward in the width direction from the side walls 22 and 32 on two sides in the width direction (two sides in the Y direction).

As shown in FIGS. 2 to 4, each busbar holding portion 40 includes two elastic pieces 41 on two sides in the X direction. Each elastic piece 41 is plate-shaped facing the X direction, and is likely to bend in the X direction. The distance, in the X direction, between the two elastic pieces 41 is set to be substantially the same as the length, in the X direction, of the recess portion B2 of the busbar B. Accordingly, the two elastic pieces 41 are provided with projections 42 that protrude outward in the X direction in a state in which the busbar holding portion 40 is inserted into the busbar B (recess portion B2).

The projections 42 can engage with (abut against) the busbar B in the Y direction in a state in which the busbar B is attached to the busbar holding portion 40. Accordingly, the busbar B is prevented from disengaging from the busbar holding portion 40 in the Y direction.

Furthermore, the housing 11 includes restricting ribs 50 on the side, in the X direction, of the busbar holding portions 40 that is opposite to the module-side terminals 12, the restricting ribs 50 extending in the width direction. Each restricting rib 50 sandwiches, together with a busbar holding portion 40, a busbar B in the vertical direction when the busbar B is attached to the busbar holding portion 40. More specifically, the restricting rib 50 is located above the busbar B in the Z direction, which is the vertical direction, and the busbar holding portion 40 is located below the busbar B in the Z direction, which is the vertical direction. Accordingly, movement of the busbar B in the Z direction is restricted. Here, for example, by using the terminal accommodating portion 30 of the module-side terminal 12 to restrict movement in the Z direction, it is possible to restrict the movement of the busbar B in the Z direction with the use of the module-side terminal 12.

The following will describe functions of the present embodiment.

The battery wiring module 10 of the present embodiment is arranged on the secondary battery BT that includes the plurality of battery cells C. The module-side terminals 12 of the battery wiring module 10 are connected to the busbars B that connect the positive and negative electrodes of the battery cells C lined up in the X direction. One end of a wire 13 is connected to a module-side terminal 12, and the other end (not-shown) of the wire 13 is connected to a not-shown battery monitoring ECU. The battery monitoring ECU can monitor voltages of the battery cells C.

In the battery wiring module 10 of the present embodiment, the busbars B are held by the busbar holding portions 40 until the busbars B are connected (for example, welded) to the secondary battery BT. At this time, while being inserted into the recess portions B2 of the busbars B, the busbar holding portions 40 are configured to engage with, using the elastic pieces 41, the busbars B in the X direction.

The following will describe effects of the present embodiment.

(1) As a result of including the busbar holding portions 40 configured to be inserted into the recess portions B2, and engage with the busbars B in the direction in which the battery cells C are lined up, so as to hold the busbars B, the battery wiring module can hold the busbars B until they are connected to the secondary battery BT.

(2) As a result of the busbar holding portions 40 including an elastic piece 41 configured to apply an elastic force in the direction in which the battery cells C are lined up, even when the busbars B move due to expansion or contraction of the battery cells C, the elastic piece is bent to allow the busbars B to move.

(3) As a result of the elastic pieces 41 being provided on two sides in the direction in which the battery cells C are lined up, even when the busbars B move due to expansion or contraction of the battery cells C, the elastic pieces are bent to allow the busbars B to move.

(4) As a result of the housing 11 being provided with the restricting ribs 50 configured to restrict, together with the busbar holding portions 40, movement of the busbars B in the stack direction, it is possible to restrict movement of the busbars B in the stack direction.

Note that the above-described embodiment can be modified and implemented in the following manner. The above-described embodiment and the following modifications can be implemented in a suitable combination without technically contradicting each other.

The above-described embodiment employs a configuration in which the restricting ribs 50 are provided, but may also employ a configuration without the restricting ribs 50. Furthermore, the shape of the restricting ribs 50 is not limited to the disclosed content, and may be modified as appropriate as long as they are configured to sandwich, together with the busbar holding portions 40, the busbars B in the vertical direction (Z direction).

The above-described embodiment employs a configuration in which the elastic pieces 41 are provided on two sides in the left-right direction, but may also employ a configuration in which an elastic piece 41 is provided on only one side in the left-right direction. Furthermore, a configuration without the elastic piece 41 may also be employed.

LIST OF REFERENCE NUMERALS

10 . . . Battery wiring module
11 . . . Housing
12 . . . Module-side terminal
13 . . . Wire
40 . . . Busbar holding portion
41 . . . Elastic piece
50 . . . Restricting rib
B Busbar
B2 . . . Recess portion
C . . . Battery cell

What is claimed is:

1. A battery wiring module comprising:
a module-side terminal configured to be electrically connected to a busbar for connecting battery terminals of a plurality of battery cells to each other;
a wire that has one end to which the module-side terminal is connected; and
a housing in which the wire and the module-side terminal are housed,
wherein the busbar is configured to connect the battery terminals of the plurality of battery cells to each other, and has a recess portion that is recessed in a stack direction in which the housing is stacked on the battery cells, and
the battery wiring module further comprises a busbar holding portion configured to be inserted into the recess portion, and engage with the busbar in a direction in which the battery cells are lined up, so as to hold the busbar.

2. The battery wiring module according to claim 1, wherein the busbar holding portion includes an elastic piece configured to apply an elastic force in the direction in which the battery cells are lined up.

3. The battery wiring module according to claim 2, wherein the busbar holding portion includes elastic pieces provided on two sides in the direction in which the battery cells are lined up.

4. The battery wiring module according to claim 1, wherein the housing is provided with a movement restricting rib configured to restrict, together with the busbar holding portion, movement of the busbar in the stack direction.

5. The battery wiring module according to claim 2, wherein the housing is provided with a movement restricting rib configured to restrict, together with the busbar holding portion, movement of the busbar in the stack direction.

6. The battery wiring module according to claim 3, wherein the housing is provided with a movement restricting rib configured to restrict, together with the busbar holding portion, movement of the busbar in the stack direction.

* * * * *